No. 737,116. PATENTED AUG. 25, 1903.
E. M. KNIGHT.
FILTERING MEDIUM AND PROCESS OF MAKING SAME.
APPLICATION FILED MAY 23, 1903.
NO MODEL.

Witnesses:
C. W. Fowler
G. L. Kerle

Inventor
Edward M. Knight
by T. Walter Fowler
his atty.

No. 737,116. Patented August 25, 1903.

UNITED STATES PATENT OFFICE.

EDWARD M. KNIGHT, OF BROOKLYN, NEW YORK.

FILTERING MEDIUM AND PROCESS OF MAKING SAME.

SPECIFICATION forming part of Letters Patent No. 737,116, dated August 25, 1903.

Application filed May 23, 1903. Serial No. 158,405. (No specimens.)

*To all whom it may concern:*

Be it known that I, EDWARD MARTIN KNIGHT, a citizen of the United States of America, residing at Brooklyn, New York, have invented certain new and useful Improvements in Filtering Mediums and in the Process of Making the Same, of which the following is a specification.

This invention relates to certain new and useful improvements in filtering mediums; and it consists of a filtering disk or pad composed of the fibers of asbestos or of asbestos and a soluble organic substance, as cotton fibers, and an intermediate layer or film of carbon.

My invention also comprises the process of making said disks or pads.

Figure 1:
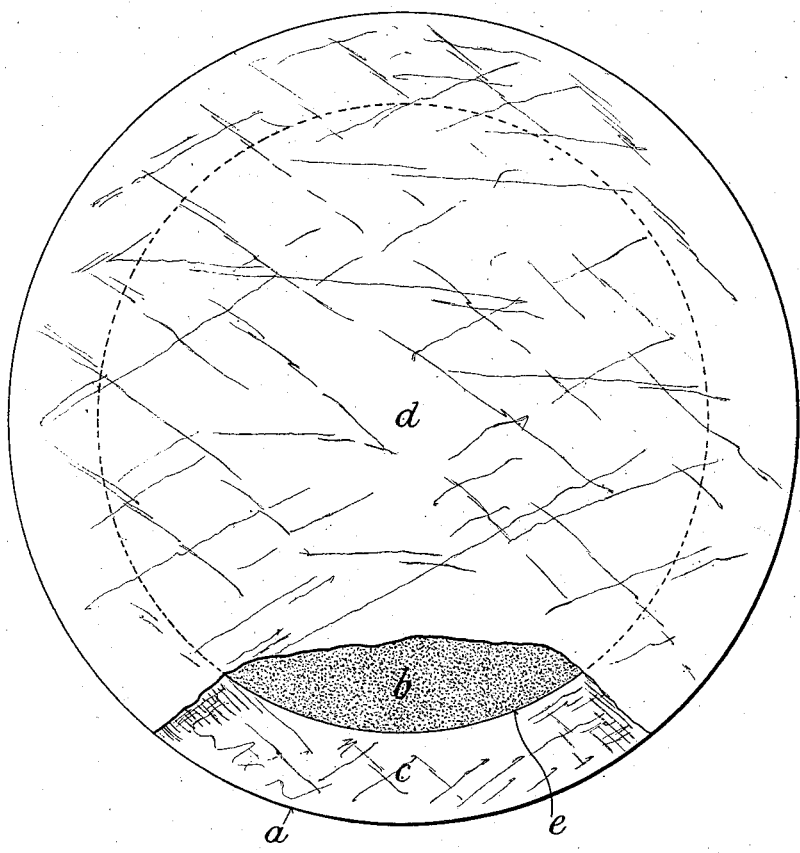
Figure 2:
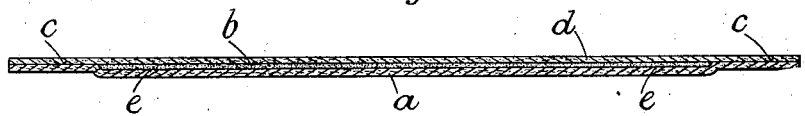

Referring to the accompanying drawings, Figure 1 represents a plan view of a filtering pad or disk with a portion of the upper layer or film broken away. Fig. 2 is a cross-section view of the pad or disk.

The filtering properties of asbestos have long been understood and appreciated by those skilled in this art, and the rapidity with which pads, disks, or films of asbestos or asbestos and cotton fibers commingled and compressed remove suspended sedimentary matter from water and other liquids has commended this type of filter to the public. In many instances it has been desirable to cause the water to be filtered to pass through a bed of granulated or pulverized purifying material, as bone-black or charcoal; but the difficulty heretofore has been to so combine such material with asbestos that the carbon is retained and the fibers of the asbestos are not disturbed or injured. If the carbon is placed between two layers or sheets of asbestos, the said sheets will not adhere, as the interposed carbon prevents the fibers of one sheet or layer from interlocking with those of the other sheet or layer. Therefore the sheets are readily separated, and the result is an unsatisfactory filter-bed liable to derangement in handling. In my practical experience with filters employing asbestos as a filtering-bed I have discovered that the carbon may be combined with the asbestos in such a manner that two separate sheets of the asbestos may be so joined by the interlocking of the fibers that the interposed carbon is retained *in situ* and the sheets rendered practically homogeneous.

In carrying out my invention I take the fibers of comminuted asbestos derived from a carding or other similar machine and subject the same to pressure to form a thin uniform disk or pad $a$. To one of the surfaces of such pad I apply the carbon $b$, the form which I prefer to use being a paste made by mixing finely-pulverized carbon with water and applying the same by means of a brush, although the carbon may be applied in a dry state without departing from the spirit of my invention. I prefer not to coat the entire surface of the pad or disk, but to leave a surrounding edge or surface $c$ uncoated, so that when a second and uncoated layer or pad $d$ is placed on the top of the first-named layer or pad the exposed fibers of the one layer will interlock with the fibers of the other layer when the two layers which comprise the completed disk or pad are subjected to pressure in a machine of suitable character.

To facilitate the union of the separate sheets or layers which make up the complete disk or pad, (and I may use as many of such sheets or layers as found necessary or desirable,) I prefer to form a slight depression $e$ in the sheet which is to carry the carbon, this depression including the whole or part of the surface to be coated, and in this depression I place the carbon. Then I apply the second layer and subject the combined layers to pressure, which unites them, as before explained, and squeezes out any air that may be contained between the layers. The result is a homogeneous disk or pad of comminuted asbestos with a concealed layer of carbon so protected that the disk may be handled without danger of cracking or injuring the carbon surface. Such a pad is cheaply made, possesses the best of filtering and purifying properties, and gives most satisfactory results.

What I claim is—

1. The process of making filtering disks or pads which consists in making a compressed layer or disk composed of fibers then applying a film of carbon to a portion only of one side or surface of said layer or disk, so as to leave a surrounding exposed portion, and finally laying a second fibrous layer or disk upon the coated surface of the first-named layer or disk and subjecting the combined layers to pressure to cause the fibers of one layer or disk to interlock with those of the other layer or disk and produce a homogeneous filter-pad.

2. The process of making filtering disks or pads which consists in subjecting comminuted asbestos or other fibers to pressure to form layers or disks, and forming one of said layers or disks with a depression inside of its outer edge; then applying a film or coating of carbon to the depressed portion of said layer or disk and finally placing upon the carbon-coated layer or disk a second and uncoated filtering layer or disk, and subjecting the combined layers or disks to pressure to drive out the air between them and to interlock the fibers of the uncoated layer or disk with the fibers on the uncoated portions of the coated layer or disk, to make a homogeneous filter-pad.

3. As an article of manufacture, a filter-pad consisting of separate layers or disks of fibrous material and an interposed carbon film or layer occupying the major portion of the layers or disks, said layers or disks united at their outer edges by the interlocking of the fibers of one layer or disk with those of the other.

In testimony whereof I have hereunto set my hand in presence of two subscribing witnesses.

EDWARD M. KNIGHT.

Witnesses:
GEORGE HARRISON,
HENRY W. LYNDEN.